United States Patent
Lotz

(10) Patent No.: US 9,782,849 B2
(45) Date of Patent: Oct. 10, 2017

(54) SCARFING MACHINE FOR SCARFING HOT AND COLD WORKPIECES MADE OF STEEL, SUCH AS SLABS, BLOCKS AND BILLETS

(71) Applicant: GEFAM GmbH, Koenigstein im Taunus (DE)

(72) Inventor: Horst Karl Lotz, Koenigstein im Taunus (DE)

(73) Assignee: GEFAM GMBH, Koenigstein im Taunus (DE)

( * ) Notice: Subject to any disclaimer, the term of this patent is extended or adjusted under 35 U.S.C. 154(b) by 177 days.

(21) Appl. No.: 14/415,060

(22) PCT Filed: Jul. 16, 2013

(86) PCT No.: PCT/EP2013/064988
§ 371 (c)(1),
(2) Date: Jan. 15, 2015

(87) PCT Pub. No.: WO2014/012922
PCT Pub. Date: Jan. 23, 2014

(65) Prior Publication Data
US 2015/0183041 A1    Jul. 2, 2015

(30) Foreign Application Priority Data

Jul. 17, 2012    (DE) .................... 20 2012 102 639 U

(51) Int. Cl.
*B23K 7/06*    (2006.01)
*B23K 37/04*    (2006.01)
(Continued)

(52) U.S. Cl.
CPC ............... *B23K 7/06* (2013.01); *B23K 37/02* (2013.01); *B23K 37/0235* (2013.01);
(Continued)

(58) Field of Classification Search
CPC ...................... B23K 2201/18; B23K 2203/04; B23K 37/02; B23K 37/0235; B23K 37/04; B23K 37/0408; B23K 7/06
(Continued)

(56) References Cited

U.S. PATENT DOCUMENTS 3,929,324 A * 12/1975 Lotz ..................... B23K 7/003
164/263
4,441,935 A *  4/1984 Middel .................. B23K 37/02
148/202
5,626,181 A *  5/1997 Lotz ................... B22D 11/1265
164/263

FOREIGN PATENT DOCUMENTS

AT             241240 B        7/1965
AT             273 619         8/1969
(Continued)

OTHER PUBLICATIONS

Patent Translation powered by EPO and Gooogle, English translation made Mar. 7, 2017, DE 202012100095, pp. 1-7.*
(Continued)

*Primary Examiner* — Scott Kastler
*Assistant Examiner* — Michael Aboagye
(74) *Attorney, Agent, or Firm* — Dennemeyer & Associates, LLC

(57) ABSTRACT

Scarfing machine (1) for scarfing hot and cold work pieces (2), such as slabs, blooms and billets made from steel in and downstream of continuous casting plants with a roller table (3) arranged in the direction of transport of the work piece, on which the work piece (2) to be scarfed can be moved back and forth. The scarfing machine (1) is set up in a gap (4) formed in the roller table (3) which has a U-shaped beam (7) with a scarfing unit (10) in the form of a rack of manifolds arranged crosswise to the roller table (3). The height of the burner beam (7) can be adjusted and it can be pivoted
(Continued)

Figure 1:
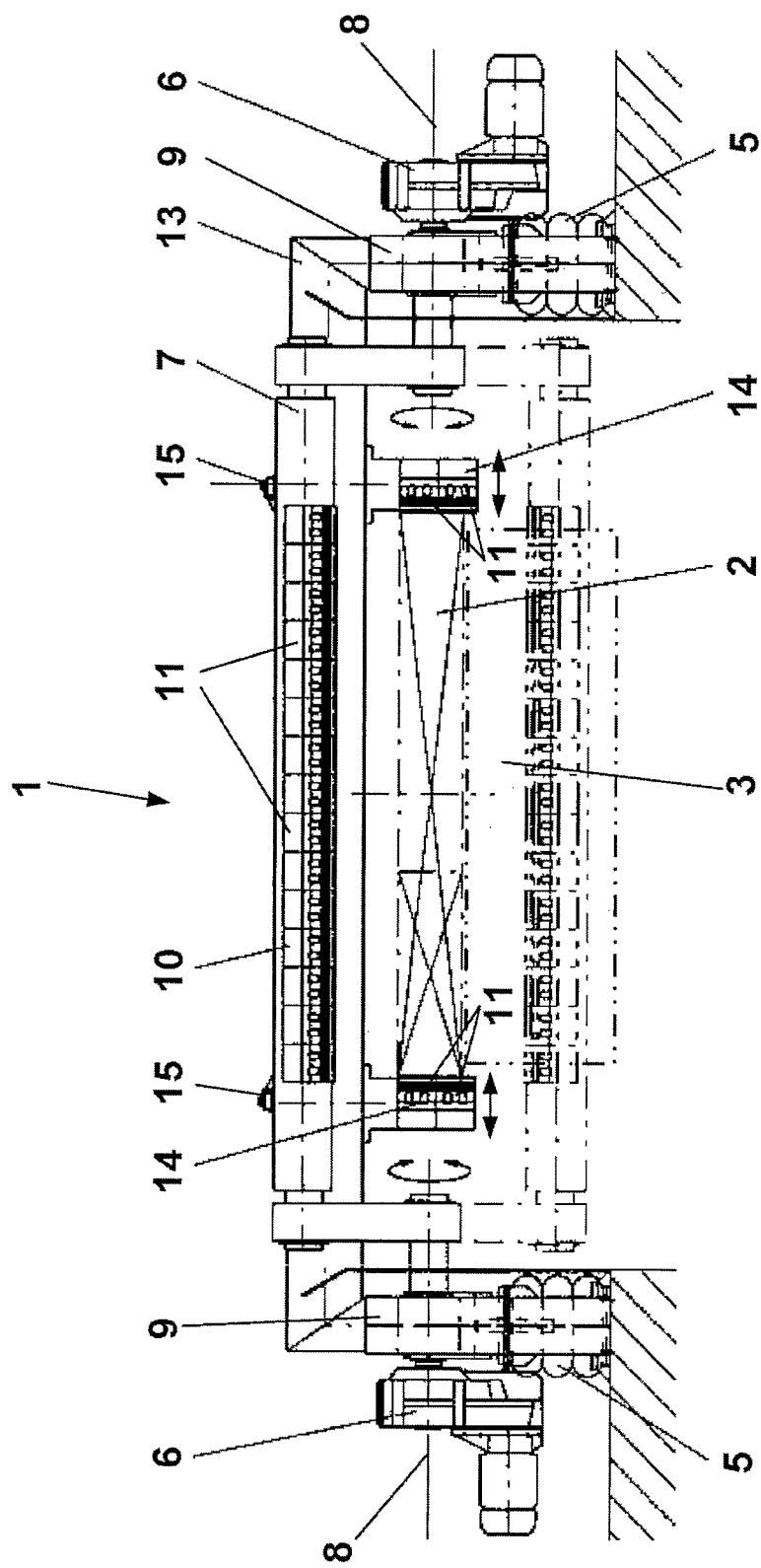

approximately 180° on a horizontal axis (8) around the top, bottom and cut sides of the work piece (2) by means of a swivelling drive (6) while the work piece is moved back and forth.

6 Claims, 2 Drawing Sheets

(51) Int. Cl.
  *B23K 37/02* (2006.01)
  *B23K 101/18* (2006.01)
  *B23K 103/04* (2006.01)

(52) U.S. Cl.
  CPC .......... *B23K 37/04* (2013.01); *B23K 37/0408* (2013.01); *B23K 2201/18* (2013.01); *B23K 2203/04* (2013.01)

(58) Field of Classification Search
  USPC .............. 266/51, 53; 164/262, 263; 148/202
  See application file for complete search history.

(56) References Cited

FOREIGN PATENT DOCUMENTS

| | | |
|---|---|---|
| DE | 734 651 C | 4/1943 |
| DE | 11 76 973 B | 8/1964 |
| DE | 26 10 047 A1 | 9/1977 |
| DE | 84 22 485 U1 | 11/1984 |
| DE | 202012100095 * 4/2012 | ............... B23K 7/06 |
| WO | 2011/160692 A1 | 12/2011 |

OTHER PUBLICATIONS

International Search Report for PCT/EP2013/064988 dated Dec. 16, 2013.
German Search Report for DE 20 2012 102 639.2 dated Aug. 6, 2012.
Written Opinion for PCT/EP2013/064988 dated Dec. 16, 2013.

* cited by examiner

SCARFING MACHINE FOR SCARFING HOT AND COLD WORKPIECES MADE OF STEEL, SUCH AS SLABS, BLOCKS AND BILLETS

FIELD OF THE INVENTION

The invention relates to a scarfing machine for scarfing hot and cold work pieces such as slabs, blooms and billets made from steel in and downstream of continuous casting plants with a roller table arranged in the direction of transport of the work piece, on which the work piece to be scarfed can be moved back and forth.

PRIOR ART

Slabs, blooms and billets made from steel in particular are usually conditioned or cleaned in order to remove material structures and surface defects that deviate from the norm, such as cracks, burrs, slag inclusions, etc.

Usually the scarfing process is initiated by preheating an edge or a strip of the surface of the work piece to the ignition temperature of steel. The width of this strip corresponds to the width of the intended scarfing path. A jet of scarfing oxygen is then applied to the pre-heated strip and a relative movement takes place between the oxygen jet and the work piece.

The work piece is generally placed flat in a horizontal position on one of its broad sides and is carried along the scarfing burners by a roller table. A conventional scarfing device has horizontally aligned top and (sometimes) bottom scarfing units which are arranged parallel to the horizontal width and end sections of a holder, so that the longitudinal sides of a work piece are scarfed in parallel when the work piece is passed horizontally through the scarfing units. If the broad sides of the work piece are also to be scarfed, the work piece is arranged in such a way that several processes are required. The disadvantage here is that, in order to turn a 30 tonne work piece, for example, a large and heavy turning device outside the roller table is required.

WO 2011/160692 A1 describes a scarfing device mounted on a roller table arranged in the transport direction of the work piece and on which the work piece to be scarfed is placed. In addition, there is a device for holding the work piece vertically on its longitudinal edge and pincher rollers for conveying the work piece to a vertical scarfing tower with a rigid, vertically arranged scarfing burner frame with several scarfing burners arranged on all four sides. The scarfing burner frame encloses the work piece to be scarfed, which is arranged vertically on its longitudinal edge. At least one water granulation nozzle installed near the scarfing burners is used to remove fused steel and slag crosswise to the vertical plane. Other pincher rollers convey the work piece to a downstream stacking device, where the work pieces are stacked face up/down on another roller table.

The disadvantage here too is the fact that several process steps are necessary in order to scarf all four sides of the work piece, namely the longitudinal edges and broad sides, so that the work piece has to be rearranged several times, which involves a lot of time and transport effort. In addition, the scarfing burner frame with its numerous scarfing burners is very expensive and complex to produce and maintain.

OBJECT

The object of the invention is to produce a scarfing machine of the type described at the outset that is compact in form and less complex and expensive to build and operate, and to reduce the media consumption of the scarfing process, while at the same time optimising the scarfing process.

SOLUTION

This object is solved by the invention with the features of the independent claim. The subclaims indicate beneficial further developments of the invention. The wording of all claims is hereby incorporated in this description by reference.

This object is accomplished according to the present invention by installing the scarfing machine in a gap created in the roller table, with a U-shaped burner beam crosswise to the roller table with a scarfing unit that takes the form of a rack of manifolds, where the height of the burner beam can be adjusted and the burner beam can swivel approx. 180° on a horizontal axis around the top, bottom and sides of the work piece by means of a swivelling drive while the work piece is moved back and forth.

In another embodiment of the scarfing machine, the height of the burner beam can be adjusted relative to the work piece by means of lifting guides and the burner beam runs in at least one frame guide. The lifting guides can be controlled pneumatically, hydraulically or electromechanically. The height is adjusted before and after the heating process and possibly during the scarfing process.

Also on the horizontal part of the burner beam is the scarfing unit, which takes the form of a rack of manifolds with a number of distributor heads with scarfing burner lips arranged side-by-side. Each distributor head has a top and bottom scarfing burner lip, which together form a scarfing oxygen slot. The lips are supplied with heating gas, heating oxygen and scarfing oxygen.

The scarfing burner lips of the distributor heads should preferably be arranged at an angle of approximately 30° to the horizontal in relation to the work piece. This blows away small particles and dirt removed during scarfing. This means that molten steel and clinker can no longer become deposited or encrusted on the work piece, the respective other scarfing unit, or other surrounding parts of the device, so that soiling is largely avoided. Furthermore, an optimum scarfing angle is achieved in relation to the work piece, ensuring economic efficiency.

In addition, a machine portal arranged crosswise to the roller table contains at least two offset side scarfing burners with distributor heads with scarfing burner lips for scarfing the longitudinal edges of the work piece.

The side scarfing burners have drives for horizontal movement.

The newly conceived scarfing machine is positioned in a gap in the transport roller table for the work pieces intended for scarfing. The roller table is divided in such a way that the scarfing machine fits into this gap and the burner beam arranged crosswise to the roller table can swivel. It should be pointed out that the scarfing machine can instead be positioned at the end of the roller table, so that the gap is more-or-less formed by the end of the roller table.

The scarfing burner lips of the distributor heads are first directed towards the front edge of the top of the work piece and the scarfing burner lips of the side scarfing burners are directed at the front edges of the longitudinal sides of the work piece. Heating gas, heating oxygen and scarfing oxygen are supplied as media. At this point, the burner beam and the scarfing unit are raised slightly to prevent ignition in the front area of the work piece. After heating, the burner beam is lowered again and the jet of scarfing oxygen is enhanced by the scarfing slot formed by the scarfing burner lips, causing the surface of the work piece also to ignite and burn off the clinker. Thus, material structures and surface defects that deviate from the norm, such as cracks, burrs, slag inclusions, etc. are removed during scarfing.

During the scarfing process the work piece is moved back and forth on the roller table by means of pincher rollers, for example.

To begin with, the work piece to be scarfed, e.g. a slab, is carried to the scarfing machine in the usual position, i.e. on one of its broad sides, on a roller table which is generally already part of a continuous casting plant. The work piece is now moved forwards or backwards through the scarfing machine via the gap in the roller table at a chosen speed in the required scarfing direction. The scarfing unit on the burner beam now scarfs the top side of the work piece. At the same time, the side scarfing burners scarf the longitudinal edges of the work piece. The work piece then stops.

The burner beam with the scarfing unit is now swivelled by 90° to the front around a horizontal axis and scarfs the front cut side of the work piece. During this process, the side scarfing burners are switched off and their output is minimised. Once this front cut side has been scarfed, the burner beam and scarfing unit pivot downwards by a further 90° and the work piece on the roller table is moved forwards or backwards. The bottom of the work piece is now scarfed. After this, the rear cut side of the work piece is scarfed in the same way as the front cut side.

This enables all six sides, namely the top and bottom, the two cut sides and the two longitudinal edges of the work piece to be scarfed using a compact scarfing machine without having to move the extremely heavy work piece in any way using a bulky, heavy-duty turning device. Such turning devices are no longer necessary with this newly-conceived scarfing machine.

This makes the scarfing machine safer and significantly more economical to produce, purchase and maintain. Furthermore, both the peak consumption of scarfing oxygen, heating oxygen and heating gas as well as the removal of flue gases, granulation water, burn-off, clinker or slag are only approximately half that of known comparable four-sided scarfing machines according to the current state of the art. The same applies to the maintenance and repair costs.

Figure 2:
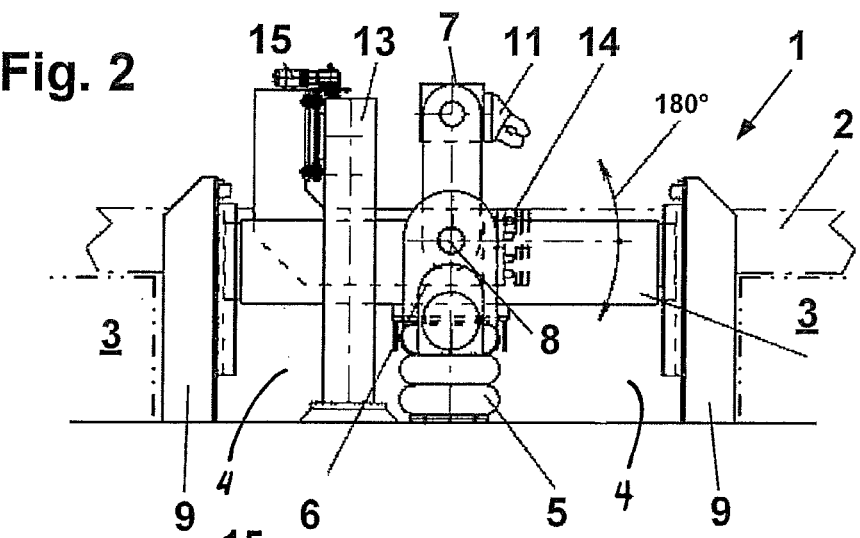
Figure 3:
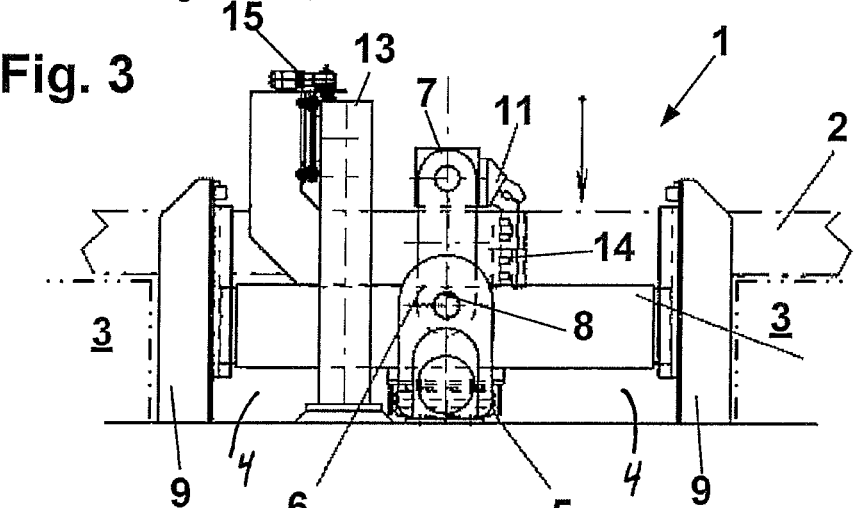
Figure 4:
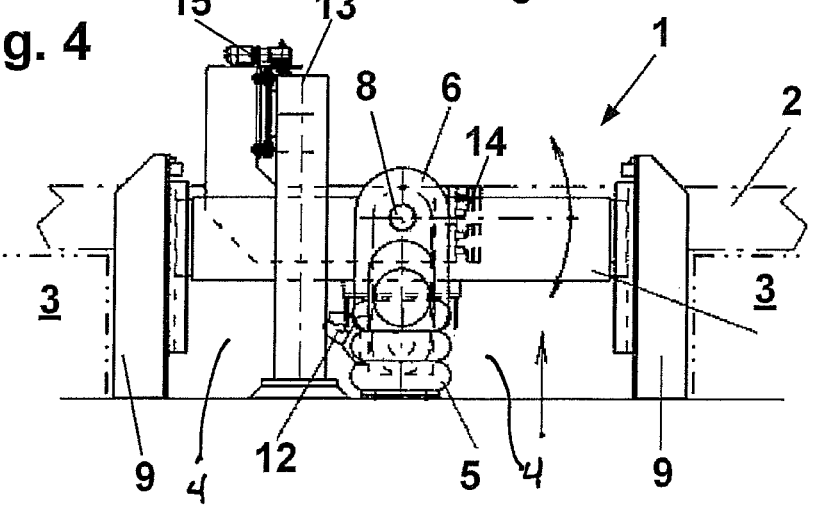

The idea behind the invention is explained in further detail in the following description on the basis of a sample implementation, which is illustrated by the drawings. These are:

FIG. 1 a front view of a scarfing machine for scarfing work pieces,

FIG. 2 a lateral view of the scarfing machine according to FIG. 1 in an initial step, FIG. 3 a lateral view of the scarfing machine according to FIG. 1 in a second step and FIG. 4 a lateral view of the scarfing machine according to FIG. 1 in a third step.

The scarfing machine 1 shown in FIG. 1 to FIG. 4 is designed for scarfing hot and cold work pieces 2, such as slabs, blooms and billets made from steel in and downstream of a continuous casting plant.

The continuous casting plant (which is not described in further detail here) features a roller table 3—indicated by a dotted line in the drawings—on which the work piece 2 is carried out of the scarfing machine 1 and which is used to move the work piece back and forth while the scarfing machine 1 does its work. As can be seen in FIG. 2 to FIG. 4 in particular, the roller table 3 forms a gap 4 in which the scarfing machine 1 is stationed and which is crosswise to the roller table 3 and therefore crosswise to the transport direction of the work piece 2. The compact design of the scarfing machine 1 means that the gap 4 is small enough to allow the work piece 2 to move through it with ease without allowing the work piece 2 to topple over.

The two sides of the roller table 3 each have a lifting guide 5 for the scarfing machine 1 with an associated swivelling drive 6. The lifting guide 5 and the swivelling drives 6 are connected to a U-shaped burner beam 7 which can be pivoted approximately 180° around a horizontal axis 8, namely from top to bottom and vice versa, as well as being height-adjustable. The burner beam 7 runs in a frame guide 9 while the height is being adjusted.

The horizontal part of the burner beam 7 has a scarfing unit 10 in the form of a rack of manifolds that features a number of distributor heads 11 arranged side-by-side. Each distributor head 11 has a top and bottom scarfing burner lip 12, whereby the distributor head 11 and the scarfing burner lips 12 are supplied with the media required for scarfing purposes, such as heating gas, heating oxygen and scarfing oxygen, by means of a supply line that is not described in further detail here. The numerous scarfing burner lips 12 thus form an integrated scarfing slot.

In addition, the scarfing machine 1 features a fixed machine portal 13, which also stretches crosswise over the roller table 3 and therefore across the work piece 2. There are two side scarfing burners 14 arranged at an offset on the machine portal 13 which can be moved horizontally along the machine portal 13 by means of drives 15. The side scarfing burners 14 also each have a number of distributor heads 11 with pairs of scarfing burner lips 12 similar to the distributor heads 11 on the burner beam 7.

While the distributor heads 11 on the burner beam 7 are provided for scarfing the top, bottom and front cut sides of the work piece 2, the distributor heads 11 of the side scarfing burners 14 are for scarfing the longitudinal sides of work piece 2.

Accordingly, the burner beam 7 can be turned by the swivelling drives 6 in order to scarf the top, front cut sides and bottom of the work piece 2.

FIG. 2 shows the scarfing machine 1 in which the burner beam 7 is raised in the frame guide 9. In this position, the distributor heads 11 of the burner beam 7 are supplied with the media required for scarfing purposes and the top side of the work piece 2 is heated and thus prepared for scarfing. Similarly, the distributor heads 11 of the side scarfing burners 14 heat the longitudinal edges of the work piece 2.

FIG. 3 shows the scarfing machine 1 in which the burner beam 7 is lowered in the frame guide 9. In this position, the distributor heads 11 of the burner beam 7 and the side scarfing burners 14 heat the top side and the two longitudinal edges of the work piece 2, whereby the work piece 2 is moved forwards or backwards through the scarfing machine 1 by means of pincher rollers arranged on the roller table 3 which are already familiar and are not shown in greater detail.

FIG. 4 shows the scarfing machine 1 in which the burner beam 7 is again raised in the frame guide 9. At the same time, the burner beam 7 is turned by 180° from its upper position into its lower position. The bottom side of the work piece 2 is now scarfed in the same manner, as shown in relation to FIG. 3. This involves moving the work piece 2 backwards or forwards through the scarfing machine 1 by means of the pincher rollers arranged on the roller table 3.

Similarly, the two front cut sides of work piece 2 are scarfed, as described in relation to FIG. 3 and FIG. 4. For example, burner beam 7 is simply turned by 90°. This process is not shown separately in the drawings.

However, it is only necessary to scarf the two longitudinal edges of work piece 2 just once.

REFERENCE NUMBERS

1 Scarfing machine
2 Work piece
3 Roller table
4 Gap
5 Lifting guide
6 Swivelling drive
7 Burner beam
8 Horizontal axis
9 Frame guide
10 Scarfing unit
11 Distributor heads
12 Scarfing burner lips
13 Machine portal
14 Side scarfing burner
15 Drive

REFERENCES CITED

Patent References Cited
WO 2011/160692 A1

The invention claimed is:

1. A scarfing machine (1) for scarfing hot and cold work pieces (2), such as slabs, blooms and billets made from steel in and downstream of continuous casting plants, with a roller table (3), having a gap (4) for placement of the scarfing machine (1) therewithin, arranged in the direction of transport of the workpiece (2), on which the workpiece (2) to be scarfed can be moved back and forth such that the workpiece (2), while being worked upon, spans the gap (4) in the roller table (3) so as to completely and simultaneously expose a top, a bottom and sides of that part of the workpiece (2) spanning the gap (4) to scarfing, characterised in that the scarfing machine (1) is set up in the gap (4) fotiiied in the roller table (3) and has a U-shaped burner beam (7) with a scarfing unit (10) in the form of a rack of manifolds arranged cross-wise to the roller table (3), wherein the burner beam (7) is adjustable to various heights within the scarfing machine (1) and is pivotable approximately 180° on a horizontal axis (8) around the top, bottom and cut sides of the workpiece (2) by means of a swiveling drive (6) while the workpiece is moved back and forth across the gap (4) in the roller table so as to access the entire surface of the workpiece (2) with burners.

2. The scarfing machine according to claim 1, characterised in that
the burner beam (7) is arranged for height adjustment relative to the workpiece (2) by means of lifting guides (5) and runs in at least one frame guide (9).

3. The scarfing machine according to claim 1, characterised in that
the scarfing unit (10), which is formed as a rack of manifolds with a number of distributor heads (11) with scarfing burner lips (12) arranged side-by-side, is arranged on the horizontal part of the burner beam (7).

4. The scarfing machine according to claim 3, characterised in that
the scarfing burner lips (12) of the distributor heads (11) are arranged at an angle of approximately 30° from the horizontal in relation to the work piece (2).

5. The scarfing machine according to claim 1, characterised in that
a machine portal (13) arranged crosswise to the roller table (3) has at least two side scarfing burners (14) with distributor heads (11) with scarfing burner lips (12) that are arranged at an offset in order to scarf the longitudinal sides of the work piece (2).

6. The scarfing machine according to claim 5, characterised in that
the side scarfing burners (14) have drives (15) for horizontal movement.

* * * * *